(12) United States Patent
Koitabashi et al.

(10) Patent No.: US 6,387,168 B1
(45) Date of Patent: May 14, 2002

(54) INK, INK CONTAINER, INK SET, INK-JET PRINTING APPARATUS AND INK-JET PRINTING PROCESS

(75) Inventors: Noribumi Koitabashi, Yokohama; Sadayuki Sugama, Tsukuba; Yoshihisa Takizawa, Machida; Hitoshi Tsuboi, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,179

(22) Filed: Dec. 20, 1999

(30) Foreign Application Priority Data

Dec. 22, 1998 (JP) .............................. 10-365634

(51) Int. Cl.$^7$ .............................................. C09D 11/00
(52) U.S. Cl. ................ 106/31.6; 106/31.86; 106/31.28; 106/31.65; 106/31.52
(58) Field of Search ...................... 106/31.6, 31.86, 106/31.28, 31.65, 31.52

(56) References Cited

U.S. PATENT DOCUMENTS 5,976,233 A   11/1999  Osumi et al. ............ 106/31.86
5,997,623 A * 12/1999  Lin .......................... 106/31.58
6,036,759 A *  3/2000  Wickramanayake et al. ..... 106/31.28
6,143,807 A * 11/2000  Lin et al. .................. 106/31.65

* cited by examiner

*Primary Examiner*—C. Melissa Koslow
*Assistant Examiner*—Veronica F. Faison
(74) *Attorney, Agent, or Firm*—Fitzpatrick, Cella, Harper & Scinto

(57) ABSTRACT

Disclosed herein is an ink comprising a first pigment, a second pigment and a dispersant, both of the pigment being dispersed in an aqueous medium, wherein the first pigment is a self-dispersing pigment having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant.

88 Claims, 6 Drawing Sheets

INK, INK CONTAINER, INK SET, INK-JET PRINTING APPARATUS AND INK-JET PRINTING PROCESS

BACKGROUND OF THE INVENTION

1. Field of the Invention

The present invention relates to inks, particularly, inks used in printing of an ink-jet system, and ink-jet printing processes. The present invention also relates to ink containers, ink sets and ink-jet printing apparatus. The present invention is applicable to all apparatus by which printing can be performed on various kinds of printing media such as paper, cloth, leather, nonwoven fabric and OHP paper, for example, business machines and instruments such as printers, copying machines and facsimiles, to which an ink-jet system is applied.

2. Related Background Art

An ink-jet system is a system having various merits of low noise, low running cost, high-speed printing, easy miniaturization of apparatus, easy formation of color images, etc. and hence widely used in printers, copying machines and the like. In such a printer or the like, inks used are generally selected from the viewpoints of ejection properties, printing properties such as fixing ability, print quality such as feathering or bleeding of printed images, optical reflection density and coloring ability, etc.

It is widely known that inks are roughly divided into two kinds of inks of dye inks and pigment inks according to a coloring material contained therein. Of these, the pigment inks have merits of, for example, being excellent in water fastness and light fastness compared with the dye inks, and permitting the achievement of clear character quality. A pigment contained in a pigment ink is generally stably dispersed in the ink using a dispersing agent such as a polymeric dispersant. A specific action thereof is as follows. Namely, pigment particles are adsorbed on the polymeric dispersant to conquer intermolecular force acting between the pigment particles, which brings on aggregation of the pigment particles, making good use of mainly electrical repulsion force and the like of the polymeric dispersant, thereby stably dispersing the pigment particles in the ink. Accordingly, it is necessary to add the polymeric dispersant to the ink according to the amount of the pigment. When printing is conducted on plain paper with such an ink by means of an ink-jet system, pigment particles aggregate due to the penetration of a solvent such as water in the ink into the paper and evaporation thereof into the air. At this time, as behavior on the paper, the cohesion of the pigment particles becomes stronger as the amount of the polymeric dispersant increases. Therefore, the diameter of an ink dot formed on the printing medium by the ink having a certain volume ejected from an ink-jet head becomes small, and as the shape thereof, a distorted shape formed upon impact on the paper almost remains as it is. It is hence necessary to control the volume of the ink ejected from the ink-jet head larger in order to provide ink dots having an optical density sufficient to form an image and a dot diameter required for printing free of occurrence of white stripes and the like. However, this requirement may have incurred the slowdown of fixing of the ink to the printing medium or deteriorated the rub-off resistance of the printed image in cooperation with the lowering of penetrability of the ink due to strong cohesion of the pigment particles on which the polymeric dispersant has been adsorbed.

It is also considered that a penetrant is contained in an ink in order to improve the penetrability of the ink into printing media so as to enlarge the diameter of an ink dot and enhance the fixing ability of the ink. However, in some cases, this method may cause phenomena unfavorable for intending the formation of a high-quality printed image, such as deterioration of dot shape (deterioration of peripheral shape of dot such as so-called feathering) and penetration of the ink into the back surface of the paper (so-called strike-through). Besides, since a coloring material penetrates into the interior of the printing medium, the optical density (OD) of ink dots may not become very high in many cases even when the dot diameter is relatively enlarged.

Further, inks using a self-dispersing pigment have been proposed. According to these inks, the diameter of a dot can be enlarged probably because the cohesion of the pigment on paper is weak compared with the inks containing a pigment dispersed by the above-described dispersing agent. However, it is not yet sufficient.

As described above, inks and printing processes, which satisfy various factors controlling the quality of a printed image, for example, the fixing ability of the inks, enlargement of ink dot diameter, evenness of density within an ink dot, high optical density of ink dot itself, etc., at a high level, and also stability as inks, particularly ejection stability as ink-jet inks, are yet in a fair way to research aimed at still more improvement.

SUMMARY OF THE INVENTION

It is an object of the present invention to provide an ink that the ink droplet applied to the printing medium moderately spreads in the lateral directions of a printing medium and is prevented from penetrating in the thickness direction of the printing medium, and consequently can provide a dot that is high and even in optical density of image within the dot and has an excellent external shape in that feathering is scarcely observed.

Another object of the present invention is to provide an ink-jet printing process which can form a high-quality image having a high optical density of image while reducing the amount of an ink applied to a printing medium.

A further object of the present invention is to provide an ink-jet printing apparatus capable of stably printing a high-quality image, and an ink container and an ink set used in this process.

A still further object of the present invention is to provide an ink for forming images and an image forming process, which can provide an optical density of image and image quality that can satisfy properties finally required of an ink forming a dot or an ink forming a pixel (including an overlapped dot portion by a dot matrix such as 3×3 or 4×4).

The above objects can be achieved by the present invention described below.

In an aspect of the present invention, there is thus provided an ink comprising a first pigment, a second pigment and a dispersant, both of the pigment being dispersed in an aqueous medium, wherein the first pigment is a self-dispersing pigment having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant.

In another aspect of the present invention, there is provided an ink used in an image printing process comprising the steps of ejecting an ink from an orifice by means of an ink-jet system; applying the ink to a printing medium; and forming an element of an image, the ink comprising a first pigment, a second pigment and a dispersant, both of the pigment being dispersed in an aqueous medium, wherein the first pigment is a self-dispersing pigment having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant.

In an aspect of the present invention, there is also provided an ink-jet printing process comprising the steps of ejecting an ink toward a printing medium by means of an ink-jet system; and forming an image on the printing medium, wherein the ink comprises a first pigment, a second pigment and a dispersant, both of the pigment being dispersed in an aqueous medium, wherein the first pigment is a self-dispersing pigment having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant.

In an aspect of the present invention, there is still also provided on an ink-jet printing process comprising the steps of ejecting an ink toward an outer surface of a coating layer of a printing medium provided with the coating layer by means of an ink-jet system; and forming an image on the outer surface of the coating layer, wherein the ink comprises a first pigment, a second pigment and a dispersant, both of the pigment being dispersed in an aqueous medium, wherein the first pigment is a self-dispersing pigment having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant.

In an aspect of the present invention, there is further provided an image forming process comprising the steps of:
  (i) providing a first ink containing an aqueous medium and a first pigment which is a self-dispersing pigment dispersible in the aqueous medium by itself, the pigment having an anionic group or a cationic group, and the group being bonded directly or through an atomic group to a surface of the pigment;
  (ii) providing a second ink containing an aqueous medium and a second pigment dispersible in the aqueous medium with a dispersant, the dispersant being at least one of a nonionic polymeric dispersant and an ionic polymeric dispersant having a same polarity as that of the group bonded to the pigment in the first ink;
  (iii) applying the first ink and the second ink on a printing medium respectively so that the first ink and the second ink come into contact with each other in liquid state on a surface of the printing medium; and
  (iv) forming an image on the recording medium.

In an aspect of the present invention, there is still further provided an image forming process comprising the steps of:
  (i) providing a first ink containing an aqueous medium and a first pigment which is a self-dispersing pigment dispersible in the aqueous medium by itself, the pigment having an anionic group or a cationic group, and the group being bonded directly or through an atomic group to a surface of the pigment;
  (ii) providing a second ink containing an aqueous medium and a second pigment dispersible in the aqueous medium with a dispersant, the dispersant being at least one of a nonionic polymeric dispersant and an ionic polymeric dispersant having a same polarity as that of the group bonded to the pigment in the first ink;
  (iii) providing a third ink containing a dye having a same polarity as that of the group bonded to the pigment in the first ink;
  (iv) applying the first, second and third inks to a printing medium so that the inks come into contact with each other in liquid state on a surface of the printing medium.

As described above, the present invention is based on the finding in the course of the research aimed at the formation of still higher-quality images by ink-jet printing that an ink containing the self-dispersing pigment, the pigment capable of being dispersed in an aqueous medium by a polymeric dispersant and the polymeric dispersant in combination satisfies various factors required for the formation of high-quality images at a very high level and is also excellent in the stability of the ink itself.

More specifically, as the form of the ink until it is ejected from a printing head, the self-dispersing pigment (first pigment) probably functioned as a dispersing agent for the pigment (second pigment) capable of being dispersed in an aqueous medium by a polymeric dispersant, so that the second pigment in the ink was able to stably keep its dispersed state even when the polymeric dispersant in the ink decreased as a whole. On the other hand, when printing was conducted on paper using this ink, the dot diameter thereof was large compared with a dot diameter by an ink comprising the second pigment and the polymeric dispersant for dispersing it or ink comprising the first pigment (self-dispersing pigment) alone. In addition, the dot uniformly diffused on the surface of the paper, was high in optical density and fixed relatively fast.

The reason why such a phenomenon is observed is not clearly known. However, it is considered to be due to the following mechanism. Namely, the second pigment on which the polymeric dispersant has been adsorbed, and the first pigment electrically repulse each other in the ink, and so the cohesion of the pigments becomes at least weak compared with the ink comprising only the pigment dispersed by the polymeric dispersant. When such an ink is applied to the surface of paper, the coloring material in the ink is hard to penetrate in the thickness direction of the paper, since the polymeric dispersant is adsorbed on the second pigment. On the other hand, with respect to diffusion in the lateral directions of the paper surface, it is considered that in the case of the ink comprising the second pigment and the polymeric dispersant, polymer molecules are entangled each other an water is an decreased by penetration of a solvent in the ink into the paper and evaporation thereof, or the polymer molecules crosslink pigment particles, whereby the pigment strongly aggregates, whereas in the ink according to this aspect of the present invention, the entanglement of the polymer molecules or the crosslinking is prevented or suppressed by the coexistence of the first pigment, and strong intermolecular force between the pigments in the ink is relieved by the repulsion between the first pigment and the polymeric dispersant, so that the ink is easy to diffuse in the lateral directions of the paper surface, and the diffusion does not become random because it is affected by the cohesion among the pigment particles though it is relieved. This is considered to appear as insurance of a greater dot diameter and roundness of a dot even by an ejected ink quantity reduced and as good compatibility when plural dots run in a line, i.e., good smoothness. This phenomenon on the paper surface becomes particularly marked when the Ka value of the ink in the Bristow method is lower than 1 ml·m$^{-2}$·msec$^{-\frac{1}{2}}$, namely, the penetrability is designed relatively low to a printing medium, and acts favorably on the formation of a high-quality image.

As described above, the inks according to this aspect are good in the dispersion stability in an ink tank, and even in the printing properties, have such great effects that the dot diameter is great, OD is high, rub-off resistance is good, and the roundness of dot is good.

The inks according to this aspect are good even when they are ejected from an ink-jet printing head. Namely, high-speed driving becomes feasible because the viscosity is low, and refilling property to a nozzle is good. With respect to ejection by an ejection system making good use of bubbling by film boiling, ejection velocity and ejected ink quantity become relatively large due to their moderate wettability to the surface of an ejection heater and/or low viscosity resistance against quick bubbling, and fluctuation is also little. Namely, ejection efficiency and ejection stability are good.

Even when an experiment is conducted with the ejected ink quantity controlled so as to become even for various kinds of inks in view of this enhancement of ejection efficiency, the dot diameter of the inks according to this aspect becomes sufficiently great. Accordingly, the enlargement of the ink dot diameter by the inks according to this aspect cannot be explained by the simple reason that the ejection efficiency is enhanced. When printing is conducted by means of the conventional BJ printing head, the use of the inks according to this aspect permits the formation of ink dots having a greater diameter because the ejected ink quality, ejection velocity and spreadability of the inks themselves act as a synergistic effect. The fact that ink dots having a sufficiently great diameter are provided even when an ejected ink quantity is reduced means that the ink thinly spreads in a wide range on the surface of a printing medium. Therefore, the ink is dried quickly, so that the time required for the fixing of the ink can be shortened.

The cohesion of the pigments on the paper surface can be further relieved by adding, to an ink according to this aspect comprising the first pigment, second pigment and polymeric dispersant, a dye having the same polarity as the group bonded to the surface of the first pigment. This contributes to further enlargement of an area factor and moreover has an additional preferable effect that a printed image on a printing medium having a resin coating layer is effectively prevented from causing "cracking".

In an aspect of the present invention, there is yet still further provided an ink container containing an ink therein, wherein the ink comprises a first pigment, a second pigment and a dispersant, both of the pigment being dispersed in an aqueous medium, wherein the first pigment is a self-dispersing pigment having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant.

In an aspect of the present invention, there is yet still further provided an ink set comprising, in combination, a black ink which comprises a first pigment, a second pigment and a dispersant, both of the pigment being dispersed in an aqueous medium, wherein the first pigment is a self-dispersing carbon black having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant, and at least one ink selected from the group consisting of a yellow ink, a magenta ink and a cyan ink.

In an aspect of the present invention, there is yet still further provided an ink-jet printing apparatus comprising ink container portions which separately contain a black ink comprising a first pigment, a second pigment and a dispersant, both of the pigment being dispersed in an aqueous medium, wherein the first pigment is a self-dispersing carbon black having an anionic group or a cationic group, the group being bonded directly or through an atomic group to a surface of the pigment, the second pigment is a pigment dispersible in an aqueous medium with the dispersant, and the dispersant is an ionic polymeric dispersant having a same polarity as that of the group bonded to the surface of the pigment or a nonionic polymeric dispersant, a yellow ink, a magenta ink and a cyan ink therein, and means for respectively ejecting the black, yellow, magenta and cyan inks by an ink-jet system.

Incidentally, as the yellow, magenta and cyan inks as referred to herein, may be used publicly known inks and inks suitably improved thereon. Inks having a Ka value in the Bristow method of at least 1 ml·m$^{-2}$·msec$^{-\frac{1}{2}}$ are particularly preferred. According to these ink container, ink set and ink-jet printing apparatus, far excellent images compared with the conventional images can be printed for the above-described reasons.

DESCRIPTION OF THE PREFERRED EMBODIMENTS

Figure 1:
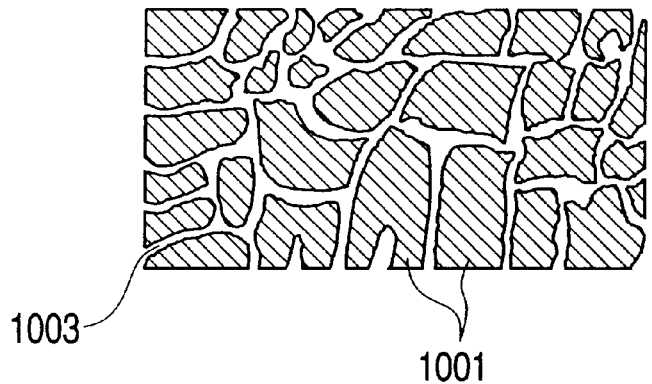
FIG. 1 schematically illustrates the "cracking" phenomenon of a print by a pigment ink, which is a problem to be solved by the present invention.

The present invention will hereinafter be described in detail based on inks according to an embodiment, by which the objects of the present invention can be achieved.

Examples of inks usable in the present invention include inks comprising, as coloring materials, a first pigment and a second pigment in a state dispersed in an aqueous medium, wherein the first pigment is a self-dispersing pigment in which at least one anionic group has been bonded directly or through another atomic group to the surface of the first pigment, or a self-dispersing pigment in which at least one cationic group has been bonded directly or through another atomic group to the surface of the first pigment, the second pigment is a pigment which can be dispersed in the aqueous medium by a polymeric dispersant or a nonionic polymeric dispersant, and the ink further comprises at least one of a polymeric dispersant having the same polarity as the group bonded to the surface of the first pigment and a nonionic polymeric dispersant.

The inks will hereinafter be described in order.

[First Pigment]

The self-dispersing pigment means a pigment which retains a state stably dispersed in water, a water-soluble organic solvent or a liquid mixture thereof without using any dispersing agent such as a water-soluble polymeric compound and does not generate such aggregates among pigment particles as interfere with normal ink ejection from orifices using an ink-jet printing technique in the liquid medium.

[Anionic Self-dispersing CB (Carbon Black)]

As such a pigment, is preferably used, for example, a pigment in which at least one anionic group has been bonded directly or through another atomic group to the surface of the pigment. A specific example thereof includes carbon black in which at least one anionic group has been bonded directly or through another atomic group to the surface thereof. Examples of such an anionic group bonded to carbon black include —COOM, —SO$_3$M, —PO$_3$HM and —PO$_3$M$_2$, wherein M is hydrogen, alkali metal, ammonium or organic ammonium.

With respect to "M" in the above-described groups, examples of the alkali metal include lithium, sodium and potassium, and examples of the organic ammonium include mono-, di- and trimethylammonium, mono-, di- and triethylammonium, and mono-, di- and trimethanolammonium.

Of these anionic groups, —COOM and —SO$_3$M are particularly preferred because they have a great effect to stabilize the dispersed state of carbon black.

It is preferred that the above-described various anionic groups be bonded to the surface of carbon black through another atomic group. Examples of said another atomic group include substituted or unsubstituted alkylene groups having 1 to 12 carbon atoms, a substituted or unsubstituted phenylene group, and a substituted or unsubstituted naphthylene group. Examples of substituent groups on the phenylene group and the naphthylene group include linear or branched alkyl groups having 1 to 6 carbon atoms.

Specific examples of the anionic group bonded to the surface of carbon black through another atomic group include —C$_2$H$_4$COOM, —PhSO$_3$M and —PhCOOM, wherein Ph is a phenylene group. It goes without saying that the present invention is not limited to these groups.

Such carbon black to the surface of which an anionic group has been bonded directly or through another atomic group as described above can be prepared, for example, in accordance with the following methods.

An example of a method for introducing —COONa into the surface of carbon black includes a method in which commercially available carbon black is subjected to an oxidation treatment with sodium hypochlorite.

An example of a method for bonding —Ar—COONa (wherein Ar is an arylene group) to the surface of carbon black includes a method in which nitrous acid is acted on an NH$_2$—Ar—COONa compound to form a diazonium salt, thereby bonding it to the surface of carbon black. It goes without saying that the present invention is not limited to this method.

[Cationic Self-dispersing CB]

(Cationically Charged CB)

Examples of carbon black cationically charged include those in which at least one selected from the group consisting of the following quaternary ammonium groups has been bonded to the surface of carbon black. —N$^+$H$_3$, —N$^+$R$_3$, —SO$_2$NH$_2$, —SO$_2$NHCOR

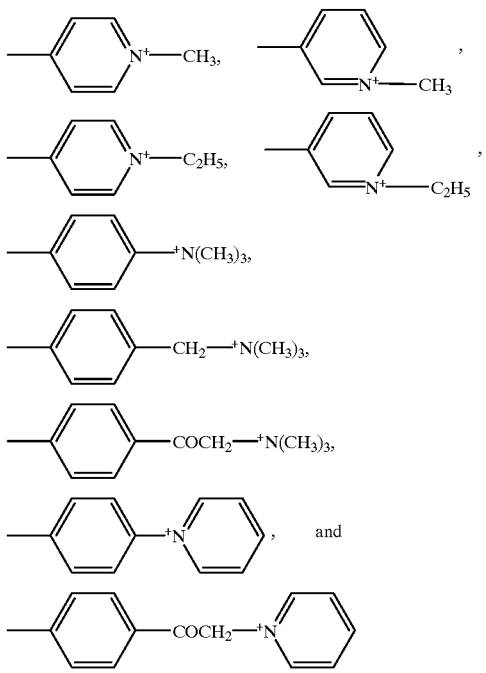

wherein R is a linear or branched alkyl group having 1 to 12 carbon atoms, a substituted or unsubstituted phenyl group, or a substituted or unsubstituted naphthyl group. Examples of substituent groups on the phenyl group and the naphthyl group include linear or branched alkyl groups having 1 to 6 carbon atoms.

As a method for producing the self-dispersing carbon black cationically charged with such a hydrophilic group as described above bonded to the surface thereof, description is given taking the case of a method of bonding, for example, an N-ethylpyridyl group of the structure described below.

Namely, carbon black is treated with 3-amino-N-ethylpyridinium bromide.

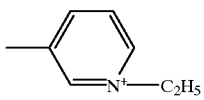

Since the carbon black anionically or cationically charged by introducing the hydrophilic group into the surface of carbon black in the above-described manner exhibit excellent dispersibility in water by virtue of repulsion of the ion thereof, it retains a stably dispersed state without adding any dispersing agent or the like even when it is contained in a water-based ink.

The above-described various hydrophilic groups may be bonded directly to the surface of carbon black. Alternatively, they may be bonded indirectly to the surface of carbon black by interposing another atomic group between the surface of carbon black and the hydrophilic group. Examples of said another atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkyl groups having 1 to 6 carbon atoms. Specific examples of the combination of said another atomic group and the hydrophilic group include —$C_2H_4$—COOM, —Ph—$SO_3$M and —Ph—COOM, wherein Ph is a phenylene group.

In the self-dispersing pigment contained in the inks according to this embodiment, it is preferred that at least 80% thereof should have a particle diameter of from 0.05 to 0.3 μm, particularly from 0.1 to 0.25 μm. A process for preparing such an ink is as described in detail in Examples which will be described subsequently.

[Second Pigment]

Examples of the second pigment usable in the inks according to this embodiment include pigments capable of being dispersed in a dispersion medium for inks, for example, an aqueous medium, by the action of a polymeric dispersant. Namely, there may be preferably used a pigment capable of being stably dispersed in the aqueous medium for the first time as a result that the polymeric dispersant has been adsorbed on the surfaces of pigment particles. Examples of such a pigment include carbon black pigments such as furnace black, lamp black, acetylene black and channel black as black pigments. Specific examples of such carbon black pigments include the following pigments which may be used either singly or in any combination thereof.

Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170 and Raven 1255 (all, products of Columbian Carbon Japan Limited);

Black Pearls L, Regal 400 R, Regal 330R, Regal 660R, Mogul L, Monarch 700, Monarch 880, Monarch 900, Monarch 1000, Monarch 1100, Monarch 1300, Monarch 1400 and Valcan XC-72R (all, products of CABOT Co.);

Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (all, products of Degussa AG); and No. 25, No. 33, No. 40, No. 47, No. 52, No. 900, No. 2300, MCF-88, MA600, MA7, MA8 and MA100 (all, products of Mitsubishi Chemical Industries Limited).

As other black pigments, may be mentioned magnetic fine particles such as magnetite and ferrite, titanium black, etc.

Blue pigments, red pigments and the like may also be used in addition to the above-described black pigments.

The total amount of the coloring materials composed of the first and second pigments is preferably within a range of from 0.1 to 15% by weight, more preferably from 1 to 10% by weight, based on the total weight of each ink. A ratio of the first pigment to the second pigment is preferably within a range of from 5/95 to 97/3, more preferably from 10/90 to 95/5, most preferably from 9/1 to 4/6. A further preferred range is such that the first pigment is contained more than the second pigment. When the first pigment is contained in a larger amount as described above, ejection stability, particularly, stability including ejection efficiency and reliability due to limited wetting on an ejection opening face is exhibited, to say nothing of dispersion stability as an ink.

As behavior of the ink on the paper, an ink containing the second pigment, on which the polymeric dispersant has been adsorbed, in a lower amount effectively spreads on the surface of paper, and so a uniform thin film of the polymeric dispersant is considered to be formed on the surface. Therefore, the rub-off resistance of the resulting image is also improved by the effect thereof.

[Polymeric Dispersant]

As the polymeric dispersant for dispersing the second pigment in the aqueous medium, there is preferably used, for example, a dispersing agent having the function of being adsorbed on the surface of the second pigment to stably disperse the second pigment in an aqueous medium. Examples of such a polymeric dispersant include anionic polymeric dispersants, cationic polymeric dispersants and nonionic polymeric dispersant.

(Anionic Polymeric Dispersant)

Examples of the anionic polymeric dispersant include polymers of a monomer as a hydrophilic component and a monomer as a hydrophobic component, and salts thereof. Specific examples of the monomer as the hydrophilic component include styrenesulfonic acid, α,β-ethylenically unsaturated carboxylic acids, α,β-ethylenically unsaturated carboxylic acid derivatives, acrylic acid, acrylic acid derivatives, methacrylic acid, methacrylic acid derivatives, maleic acid, maleic acid derivatives, itaconic acid, itaconic acid derivatives, fumaric acid and fumaric acid derivatives.

Examples of the monomer as the hydrophobic component include styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkyl acrylates and alkyl methacrylates.

Specific examples of the salts of the polymers include onium compounds with hydrogen, an alkali metal, ammonium ion, organic ammonium ion, phosphonium ion, sulfonium ion, oxonium ion, stibonium ion, stannonium ion or iodonium ion. However, the salts are not limited to these salts. To the above polymers and salts thereof, may be suitably added a polyoxyethylene group, hydroxyl group, acrylamide, acrylamide derivative, dimethylaminoethyl methacrylate, ethoxyethyl methacrylate, butoxyethyl methacrylate, ethoxytriethylene methacrylate, methoxypolyethylene glycol methacrylate, vinylpyrrolidone, vinylpyridine, vinyl alcohol, alkyl ether and the like.

(Cationic Polymeric Dispersant)

As the cationic dispersant, there is used a copolymer of a tertiary amine monomer or a quaternized product thereof with a hydrophobic monomer, or the like. Examples of the tertiary amine monomer used include N,N-dimethylaminoethyl methacrylate and N,N-dimethylacrylamide. Examples of the hydrophobic monomer used include styrene, styrene derivatives and vinylnaphthalene. In the case of a tertiary amine, as a compound for forming a salt, sulfuric acid, acetic acid, nitric acid or the like is used. Compounds quaternized with methyl chloride, dimethylsulfuric acid or the like may also be used.

(Nonionic Polymeric Dispersant)

Examples of the nonionic polymeric surfactant include polyvinyl pyrrolidone, polypropylene glycol and vinylpyrrolidone-vinyl acetate copolymers.

The combination of the above-described first pigment, second pigment and polymeric dispersant is suitably selected to disperse or dissolve them in an aqueous medium, whereby an ink according to this embodiment can be obtained. When a self-dispersing pigment, in which at least one anionic group has been bonded directly or through another atomic group to the surface of the pigment, is used as the first pigment, the combination of at least one selected from the group consisting of an anionic polymeric dispersant and a nonionic polymeric dispersant as the polymeric dispersant is preferred from the viewpoint of stability of the resulting ink. For the same reason, the combination of at least one selected from the group consisting of a cationic polymeric dispersant and a nonionic polymeric dispersant with the first pigment is preferred when a self-dispersing pigment, in which at least one cationic group has been bonded directly or through another atomic group to the surface of the pigment, is used as the first pigment.

[Aqueous Medium]

As the aqueous medium used as a dispersion medium for the first and second pigments, a water-soluble organic solvent is used.

Examples of the water-soluble organic solvent include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols the alkylene moiety of which has 2 to 6 carbon atoms, such as ethylene glycol, propylene glycol, trimethylene glycol and triethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. Such water-soluble organic solvents as mentioned above may be used either singly or in any combination thereof.

[Penetrability of Ink into Printing Medium]

The inks according to this embodiment, which contain the above-described respective components, can provide image dots having an extremely even density when, for example, the Ka value thereof is controlled to lower than 1 ml·m$^{-2}$·msec$^{-1/2}$ paying attention to the penetrability into printing media. The penetrability of the inks into the printing media will hereinafter be described.

When the penetrability of an ink is expressed in terms of the ink quantity V per m$^2$, the quantity V (unit: milliliter/M$^2$=$\mu$m) of the ink penetrated upon elapsed time t after the ejection of an ink droplet is known to be represented by the following Bristow's equation $$V = Vr + Ka(t-tw)^{1/2}$$

wherein t>tw.

Right after the ink droplet is impacted on the surface of the printing medium, the ink droplet is almost absorbed in irregularities (rough portions on the surface of the printing medium) on the surface, and scarcely penetrates into the interior of the printing medium. The time during that is tw (wet time), and the quantity of the ink absorbed in the irregularities during that is Vr. When the elapsed time after the ejection of the ink droplet exceeds tw, the penetrated quantity V increases by a quantity proportional to one half power of the excess time (t−tw). Ka is a proportionality factor of the increased quantity and shows a value according to the penetration velocity.

The Ka value was measured by means of a dynamic penetrability tester S (manufactured by Toyo Seiki Seisaku-Sho, Ltd.) for liquid by the Bristow method. In this experiment, PB paper produced by Canon Inc. who is the present applicant was used as a printing medium (recording paper). This PB paper is recording paper used in both copying machines and LBP using an electrophotographic system, and printers using an ink-jet system.

In PPC paper which is paper for electrophotography produced by Canon Inc., the same results were also able to be yielded.

The Ka value is determined according to the kind and amount of a surfactant added. For example, penetrability becomes higher by adding ethylene oxide adduct of 2,4,7,9-tetramethyl-5-decyne-4,7-diol (hereinafter referred to as "Acetylenol", trade name, available from Kawaken Fine Chemicals Co., Ltd.) which is a nonionic surfactant.

In the case of an ink containing no Acetylenol (content: 0%), the penetrability is low and has the nature as an overlapping ink which will be defined subsequently. In the case where Acetylenol is mixed in a proportion of 1%, the ink penetrates into the interior of recording paper in a short period of time and has the nature as a high-penetrable ink. An ink in which Acetylenol is mixed in a proportion of 0.35% has the nature as a semi-penetrable ink lying between both inks.

TABLE 1

| | Ka value (ml · ml$^{-2}$ · msec$^{-1/2}$) | Acetylenol content (%) | Surface tension (dyne/cm) |
|---|---|---|---|
| Overlapping ink | Lower than 1 | Not lower than 0, but lower than 0.2 | Not lower than 40 |
| Semi-penetrable | Not lower than 1, but lower than 5.0 | Not lower than 0.2, but lower than 0.7 | Not lower than 35, but lower than 40 |
| High-penetrable ink | Not lower than 5.0 | Not lower than 0.7 | Lower than 35 |

Table 1 shows the Ka values, Acetylenol contents (%) and surface tensions (dyn/cm) of "overlapping ink", "semi-penetrable ink" and "high-penetrable ink". The penetrability of each ink into the recording paper which is a printing medium becomes higher as the Ka value is higher. Namely, the lower the surface tension, the higher the penetrability.

The Ka values in Table 1 have been measured by means of a dynamic penetrability tester S (manufactured by Toyo Seiki Seisaku-Sho, Ltd.) for liquid by the Bristow method as described above. In this experiment, the above-described PB paper (product of Canon Inc.) has been used as recording paper. In the above-described PPC paper (product of Canon Inc.), the same results have also been able to be yielded.

The ink defined as "high-penetrable ink" contains Acetylenol in a proportion of 0.7% or higher and yields good results as to penetrability. As the standard of penetrability which is to be imparted to the inks according to this embodiment, the Ka value is preferably controlled to the Ka value of "overlapping ink", i.e., lower than 1.0 $ml \cdot m^{-2} \cdot msec^{-\frac{1}{2}}$, particularly not higher than 0.4 $ml \cdot m^{-2} \cdot msec^{-\frac{1}{2}}$.

[Addition of Dye]

A dye may be further added to the inks according to the above-described embodiment. More specifically, an ink obtained by further adding a dye to the ink comprising the first pigment, the second pigment and the dispersing agent for dispersing the second pigment in an aqueous medium can form a high-quality image free of such "cracking" 1003 among aggregates 1001 of the pigments as illustrated in FIG. 1 on a printing medium having a resin layer as a coating layer on its surface as a recording medium. The reason why "cracking" of the image on the printing medium having the resin layer can be effectively prevented by the ink to which the dye has been further added is not clearly known. However, the reason is considered to be as follows. Namely, when an image is formed on the printing medium using the ink to which the dye has been further added, the aggregates of the pigment formed on the printing medium exist in the form of fine particles as shown as 2001 in FIG. 2B, and the peripheries thereof are surrounded with the dye. In addition, portions in which no aggregate exists are filled with the dye. The cohesion of the second pigment is relieved by the presence of the first pigment as described above, and the cohesion of the second pigment is still further relieved by the addition of the dye, so that unevenness of the printed image, such as "cracking", which is easy to occur in a printing medium poor in ink absorbency compared with plain paper, can be effectively prevented. Examples of the dye usable in this embodiment include anionic dyes and cationic dyes. It is preferred that a dye having the same polarity as the group bonded to the surface of the first pigment be used.

Figure 2A:
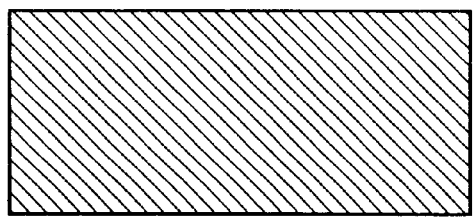
FIG. 2A illustrates a result obtained by conducting solid-printing with an ink according to an embodiment of the present invention.
Figure 2B:
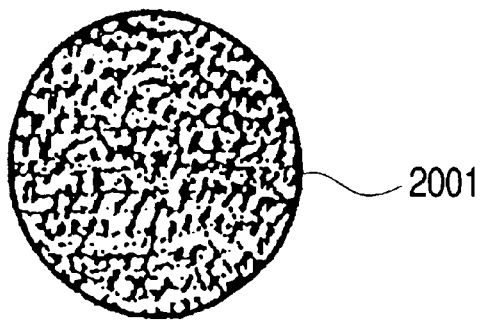
FIG. 2B is a partially enlarged view of FIG. 2A.

FIG. 2A is an example of a solid print printed with the black ink of the present invention. There is clearly shown in FIG. 2B, which is an enlarged view of a solid printed portion of FIG. 2A, the fact that the aggregates 200 in the form of fine particles are surrounded with the dye.

[Anionic and Cationic Dyes]

As anionic dyes soluble in such an aqueous medium used in this embodiment as described above, there may be suitably used publicly known acid dyes, direct dyes, reactive dyes and the like. As cationic dyes, there may be suitably used publicly known basic dyes. It is particularly preferred to use dyes having a disazo or trisazo structure as a skeletal structure for both dyes. It is also preferable to use two or more dyes different in skeletal structure from each other. As dyes used other than black (Bk) dyes, cyan (C), magenta (M) an d yellow (Y) dyes may also be used so far as the color tone is not very varied.

[Amount of Dye Added]

The amount of dye added may be 5 to 60% by weight based on the total weight of the coloring materials. However, taking the effective use of the effect of the combination of the first and second pigments Into consideration, it is preferably less than 50% by weight. When an ink is pre pared attaching great importance to printability on plain paper, it is preferable to control the amount to from 5 to 30% by weight.

[Printing Process]

The inks according to this embodiment are applied to a printing medium by means of a publicly known ink applying means to form an image.

An ink applying system in a preferred embodiment of the present invention is a publicly known ink-jet printing system. Namely, the inks according to this embodiment are suitably used in a system that an ink is ejected from a printing head to a printing medium to conduct printing. As an ejection system in the printing head, a publicly known system such as piezo system can be adopted. However, as a preferred embodiment, is preferred a system that thermal energy is applied to an ink, thereby generating bubbles in the ink, and the ink is ejected by the pressure of the bubbles.

The shot-in quantity on the printing medium of the ink ejected from the printing head is preferably at most 0.014 $pl/\mu m^2$. More specifically, it is preferably at most 70 $pl/\mu m^2$ at 360 dpi, or 25 $pl/\mu m^2$ at 600 dpi. This is attributed to the fact that when one pigment is used as a coloring material, an area factor may be insufficient on plain paper in particular to lower OD in some cases, whereas according to the ink of this embodiment, the area factor can be made greater as described above, so that so much shot-in ink quantity is not required.

Ink containers such as an ink cartridge containing the ink according to this embodiment therein and a printing head in which an ink container portion containing the ink therein and a means for ejecting the ink are integrally formed, and which is detachably installed in an ink-jet printer, are also included in an embodiment of the present invention.

An ink set comprising a black ink according to the present invention which comprises a self-dispersing carbon black mentioned above, as a coloring material, and at least one color ink selected from the group consisting of a yellow ink, a magenta ink and a cyan ink, separately contained in a independent ink container, is also included in one embodiment of the present invention.

Figure 7:
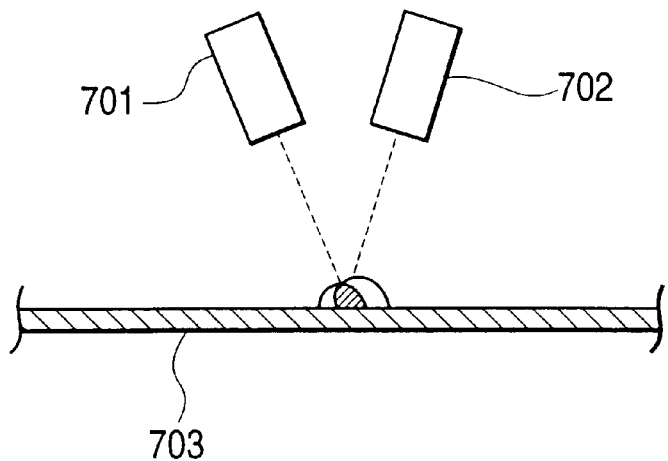
FIG. 7 schematically illustrates an image forming process according to an embodiment of the present invention.

The effect of relieving the cohesion of pigments brought about by the interaction among the first pigment, second pigment and polymeric dispersant based on the finding by the present inventors as described above, and the effect of being able to form an excellent image on a printing medium brought about by the relieving effect can be, of course, achieved by a single ink containing these components. However, the same effects can be exhibited, for example, even by bringing these components into contact with one another all in liquid states on a printing medium. More specifically, as illustrated in, for example, FIG. 7, a step of ejecting a first ink containing the first pigment from a first ink-jet head 701 to apply the ink to a prescribed position of a printing medium 703, and a step of ejecting a second ink containing at least one of a polymeric dispersant having the same polarity as the group bonded to the surface of the first pigment and a nonionic polymeric dispersant and the second pigment from a second ink-jet head 702 to apply the ink to the position of the printing medium 703, to which the first ink has been applied, or a position to which the fist ink will be applied are performed in such timing that the first ink and the second ink are mixed both in liquid states with each other on the printing medium 703, whereby even ink dots great in area factor, excellent in external shape and high in optical density of image within the dots can also be formed.

Figure 8:
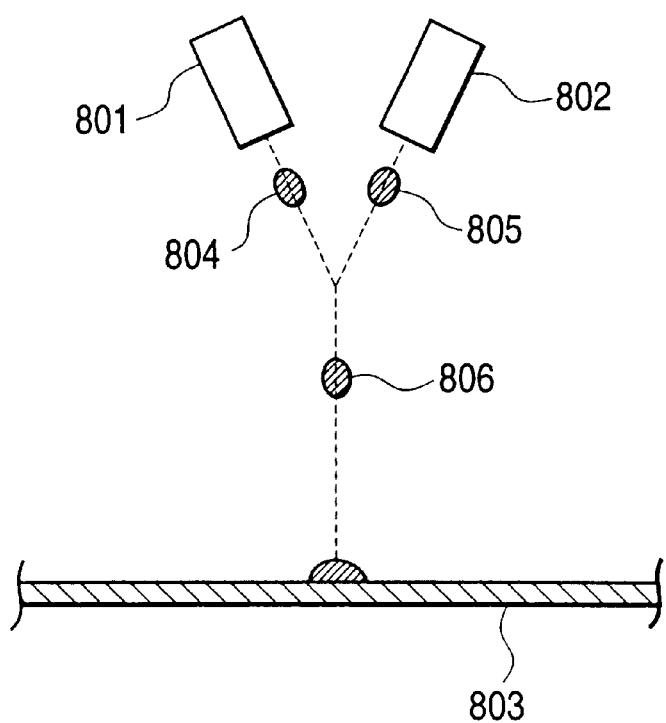
FIG. 8 schematically illustrates an image forming process according to another embodiment of the present invention.

As illustrated in FIG. 8, a state that a first ink and a second ink have been brought into contact with each other both in liquid states on a printing medium 803 can also be realized by a process in which the first ink containing the first pigment is ejected (804) from a first ink-jet head 801 on one hand, the second ink containing at least one of a polymeric dispersant having the same polarity as the group bonded to the surface of the first pigment and a nonionic polymeric dispersant and the second pigment is ejected (805) from a second ink-jet head 802 on the other hand, thereby combining the inks (804, 805) ejected from the respective ink-jet heads with each other before they are applied to the printing medium 803, and an ink mixture 806 composed of the first and second inks is applied to a prescribed position of the printing medium 803. It goes without saying that the positions on the printing medium 803, to which the respective inks are applied, may be more or less different so far as these inks are brought into contact with each other both in liquid states.

In this embodiment, it is preferred that the respective inks be prepared in such a manner that the Ka value in the Bristow method of the ink mixture composed of the first and second inks is lower than 1 ml·m$^{-2}$·msec$^{-1/2}$.

Figure 9:
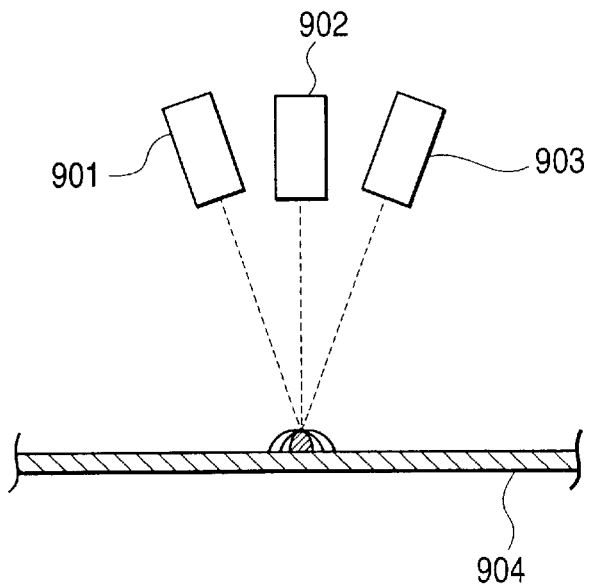
FIG. 9 schematically illustrates an image forming process according to a further embodiment of the present invention.

Similarly, the effect of relieving the cohesion of pigments brought about by the interaction among the first pigment, second pigment, polymeric dispersant and dye, and the effect of being able to form an excellent image on a printing medium, particularly, a printing medium having a resin coating layer brought about by this relieving effect can be achieved not only by a single ink containing these 4 components, but also by bringing these components into contact with one another all in liquid states on a printing medium. More specifically, as illustrated in FIG. 9, a step of ejecting a first ink containing the first pigment from a first ink-jet head 901 to apply the ink to a prescribed position of a printing medium 904, a step of ejecting a second ink containing at least one of a polymeric dispersant having the same polarity as the group bonded to the surface of the first pigment and a nonionic polymeric dispersant and the second pigment from a second ink-jet head 902 to apply the ink to the prescribed position of the printing medium 904, and a step of ejecting a third ink containing a dye having the same polarity as the group bonded to the surface of the first pigment from a third ink-jet head 903 to apply the ink to the prescribed position of the printing medium 904 are performed in such timing that the first ink, the second ink and the third ink are mixed all in liquid states with one another on the printing medium 904, whereby even ink dots great in area factor, excellent in external shape and high in optical density of image within the dots can also be formed. It goes without saying that the positions on the printing medium 904, to which the respective inks are applied, may be more or less different so far as these inks are brought into contact with one another all in liquid states.

Figure 10:
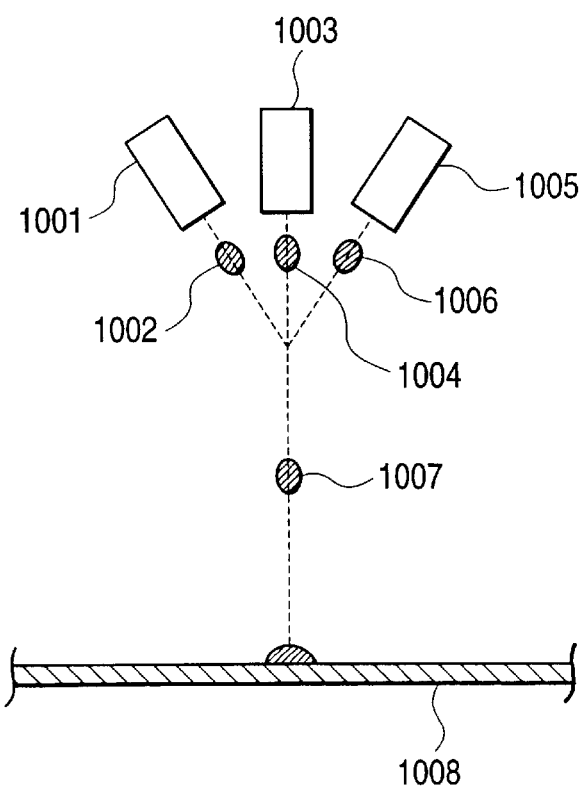
FIG. 10 schematically illustrates an image forming process according to a still further embodiment of the present invention.

As illustrated in FIG. 10, a state that a first ink, a second ink and a third ink have been brought into contact with one another all in liquid states on a printing medium 1008 can also be realized by a process in which the first ink containing the first pigment is ejected (1002) from a first ink-jet head 1001, the second ink containing at least one of a polymeric dispersant having the same polarity as the group bonded to the surface of the first pigment and a nonionic polymeric dispersant and the second pigment is ejected 1004 from a second ink-jet head 1003, the third ink containing the dye having the same polarity as the group bonded to the surface of the first pigment is ejected (100) from a third ink-jet head 1005, thereby combining the inks ejected from the respective ink-jet heads with one another before they are applied to the printing medium 1008, and an ink mixture 1007 composed of the first, second and third inks is applied to a prescribed position of the printing medium 1008. In this case, it is also preferred that the respective inks be prepared in such a manner that the Ka value in the Bristow method of the ink mixture composed of the first, second and third inks is lower than 1 ml·m$^{-2}$·msec$^{-1/2}$.

[Printing Medium]

No particular limitation is imposed on the printing medium used in this embodiment, and examples of usable printing media include paper, nonwoven fabric, OHP paper and leather. When an ink according to an embodiment of the present invention is applied by means of an ink-jet system to a printing medium on which a resin layer has been formed as a coating layer, "cracking" of an image formed on the coating layer can be extremely effectively prevented as described above.

As examples of the printing medium having a resin layer as a coating layer, those obtained by providing a resin layer on, for example, paper or a plastic film such as a polyester film are known. A material for forming the coating layer comprises a water-soluble resin, water-dispersible resin or the like as a main component, and besides a cationic compound, surfactant, filler and/or the like may be suitably used.

As examples of the water-soluble resin, may be mentioned synthetic resins, such as polyvinyl alcohol and modified products thereof such as anionically modified polyvinyl alcohol, cationically modified polyvinyl alcohol and acetal-modified polyvinyl alcohol; hydrophilic polyurethane; polyvinyl pyrrolidone and modified products thereof such as copolymers of vinyl pyrrolidone and vinyl acetate, copolymers of vinylpyrrolidone and dimethylaminoethyl methacrylate, copolymers of quaternized vinyl pyrrolidone and dimethylaminoethyl methacrylate and copolymers of vinylpyrrolidone and methacrylamidopropyltrimethyl-ammonium chloride; cellulosic water-soluble resins such as carboxymethyl cellulose, hydroxyethyl cellulose and hydroxypropyl cellulose, and modified products of cellulose such as cationic hydroxyethyl cellulose; polyester, polyacrylic acid (esters), melamine resins and modified products thereof; and graft copolymers comprising polyester and polyurethane; and natural resins such as albumin, gelatin, casein, starch, cationic starch, gum arabic and sodium alginate.

As examples of the water-dispersible resin, may be mentioned a great number of resins such as polyvinyl acetate, ethylene-vinyl acetate copolymers, polystyrene, styrene-(meth)acrylate copolymers, (meth)acrylate polymers, vinyl acetate-(meth)acrylic acid (ester) copolymers, poly(meth) acrylamide, (meth)acrylamide copolymers, styrene-isoprene copolymers, styrene-butadiene copolymers, styrene-propylene copolymers, polyvinyl ether and silicone-acrylic copolymers. However, it goes without saying that the present invention is not limited to these resins.

Besides, a cationic compound is also suitably used as a material for the coating layer of the printing medium. No particular limitation is imposed on the cationic compound so far as it contains a cationic moiety in its molecule. Examples thereof include quaternary ammonium salt type cationic Surfactants such as monoalkylammonium chloride, dialkylammonium chloride, tetramethylammonium chloride, trimethylphenylammonium chloride and ethylene oxide-added ammonium chloride; amine salt type cationic surfactants; and amphoteric surfactants of the alkylbetaine, imidazolium betaine and alanine types containing a cationic moiety. As polymers and oligomers, may be mentioned cationically modified polyacrylamide, copolymers of acrylamide and a cationic monomer, polyallylamine, polyamine sulfone, polyvinylamine, polyethylene imine, polyamide-epichlorohydrin resins and polyvinylpyridinium halides.

Further, homopolymers of vinyloxazolidone monomers and copolymers with other common monomers, homopolymers of vinylimidazole monomers and copolymers with other monomers may also be mentioned.

Examples of said other monomers include methacrylates, acrylates, acrylonitrile, vinyl ether, vinyl acetate, ethylene and styrene. Cationically modified cellulose may also be used.

Such cationically modified compounds as described above are preferably used. However, it goes without saying that the cationic compounds are not limited to these compounds.

The thickness of the coating layer is preferably within a range of from 0.1 g/m$^2$ to 100 g/m$^2$ in terms of dry weight. The coating layer may be formed by one layer or a multilayer structure such as a two-layer or three-layer structure.

The printing medium on which such a coating layer as described above has been formed is effective for preventing particularly "cracking" by using the ink according to this embodiment as described above. Besides such an effect, an effect of offsetting the demerit of dyes that wettability to the coating layer is poor can be brought about, since the pigments themselves are good in wettability to the coating layer. More specifically, the use of a mixed ink containing the pigments and dye according to this embodiment can also prevent the occurrence of beading, which is caused by using an ink containing a dye alone as a coloring material.

The present invention will hereinafter be described more specifically by the following Examples.

EXAMPLE 1

Figure 3:
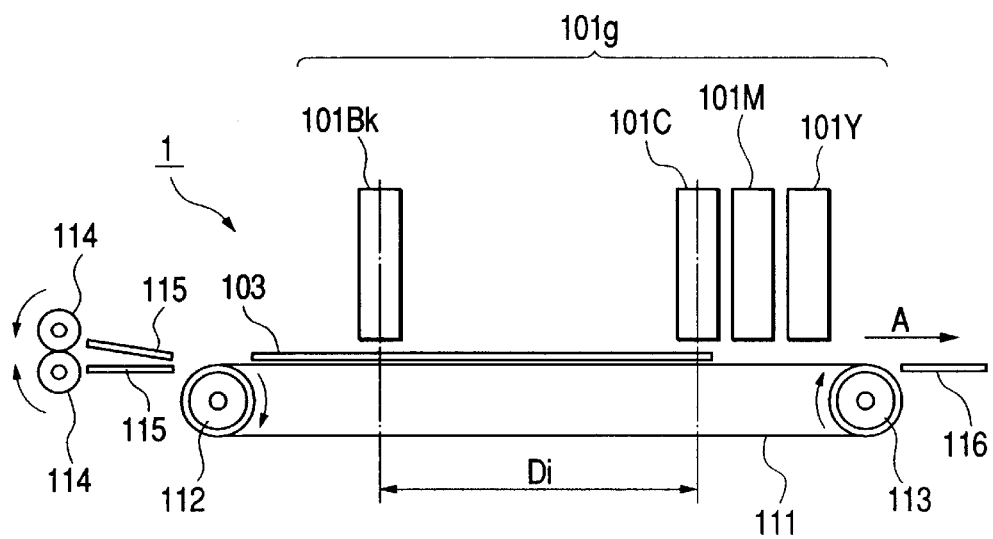
FIG. 3 is a side view illustrating the schematic construction of an ink-jet printing apparatus according to an embodiment of the present invention.

FIG. 3 is a side view illustrating the schematic construction of a full-line type printing apparatus according to a first embodiment.

This printing apparatus 1 adopts an ink-jet printing system that an ink is separately ejected from a plurality of full-line type printing heads arranged at the prescribed positions along the conveying direction (direction of an arrow A in FIG. 3) of a recording medium as a printing medium to conduct printing, and is operated under control by a control circuit (not illustrated).

Printing heads 101Bk, 10C, 101M and 101Y in the head group 101g are respectively provided with about 7,200 ink ejection openings along the width direction (direction perpendicular to the plane in FIG. 3) of the recording paper fed in the direction of the arrow A to permit printing on A3-sized recording paper on the maximum.

The recording paper 103 is fed in the direction of the arrow A by the rotation of a pair of resist rollers 114 driven by a feed motor, guided by a pair of guide plates 115 to align the leading edge thereof, and then fed on to a conveyor belt 111. The conveyor belt 111, which is an endless belt, is supported by 2 rollers 112 and 113. The recording paper 103 is conveyed by rotational driving of the roller 113. The suction of the recording on the conveyor belt 111 is conducted by electrostatic suction. The roller 113 is rotationally driven by a driving source such as a motor (not illustrated) in a direction to convey the recording paper 103 in the direction of the arrow A. The recording paper 103 conveyed on the conveyor belt 111 and during which printing has been made by the printing head group 101g is discharged on a stocker 116.

The respective printing head in the printing head group 101g, i.e., a head 101Bk containing an ink which comprises a black pigment (self-dispersing carbon black) as the first pigment, the second pigment capable of being dispersed in an aqueous medium by the polymeric dispersant, and said polymeric dispersant, all, described above as to the embodiments of the present invention, and heads (cyan head 101C, magenta head 101M and yellow head 101Y) respectively containing color inks, are arranged in the conveying direction A of the recording paper 103 as illustrated in FIG. 3. The inks of the respective colors are ejected by the respective printing heads, thereby permitting printing of black characters and color images.

The composition of the Bk ink used in this example is as follows. Incidentally, the amounts of the respective components described below are expressed in terms of parts by weight.

| | |
|---|---|
| Pigment dispersion 1 | 25 parts |
| Pigment dispersion 4 | 25 parts |
| Glycerol | 6 parts |
| Diethylene glycol | 7 parts |
| Acetylenol EH (trade name, product Kawaken Fine Chemicals Co., Ltd.) | 0.2 parts |
| Water | Balance. |

The pigment dispersion 1 was prepared in the following manner. After 300 g of acid carbon black ("MA-77", trade name; pH: 3.0; product of Mitsubishi Chemical Industries Limited) were thoroughly mixed with 1,000 ml of water, 450 g of sodium hypochlorite (available chlorine concentration: 12%) were added dropwise to the mixture, followed by stirring for 10 hours at 100 to 105° C. The resultant slurry was filtered through Toyo Filter Paper No. 2 (product of Advantes Co.) to fully wash the resultant pigment particles with water. The wet cake of this pigment was dispersed again in 3,000 ml of water, and the dispersion was desalted by means of a reverse osmosis membrane to a conductivity of 0.2 μs. The pigment dispersion (pH: 8 to 10) was concentrated to a pigment concentration of 10% by weight. The above-described process was followed to obtain the pigment dispersion 1 in which self-dispersing carbon black anionically charged by bonding a hydrophilic group —COO$^-$ directly to the surface thereof was dispersed.

The pigment dispersion 4 was prepared in the following manner. Fourteen parts of a styrene-acrylic acid-ethyl acrylate terpolymer (acid value: 180; average molecular weight: 12,000) as a dispersing agent, 4 parts of monoethanolamine and 72 parts of water were mixed, and the mixture was heated to 70° C. in a water bath, thereby completely dissolving the resin. At this time, the resin may not be completely dissolved if the concentration of the resin to be dissolved is low. Therefore, the desired resin solution may also be prepared by preparing a high-concentration solution in advance and diluting this solution. To this solution, were added 10 parts of carbon black (MCF-88, trade name; pH: 8.0; product of Mitsubishi Kagaku Co., Ltd.) which may be dispersed in an aqueous medium for the first time by the action of the dispersing agent to premix the components for 30 minutes. Thereafter, the resultant premix was treated under the following conditions to obtain the pigment dispersion 4 in which carbon black (MCF-88) was dispersed in the aqueous medium by the dispersing agent.

Dispersing machine: sand grinder (manufactured by Igarashi Kikai K.K.)

Grinding medium: zirconium beads (diameter: 1 mm)

Packing rate of grinding medium: 50% (by volume)

Grinding time; 3 hours

Centrifugal treatment (12,000 rpm, 20 minutes).

The Ka value of the thus-prepared Bk ink was 0.40 ml·m$^{-2}$·msec$^{-½}$.

EXAMPLE 2

As another example of the Bk ink, an ink comprising the following components may also be used.

| | |
|---|---|
| Pigment dispersion 2 | 45 parts |
| Pigment dispersion 4 | 5 parts |
| Glycerol | 6 parts |
| Triethylene glycol | 5 parts |
| Acetylenol EH (trade name, product Kawaken Fine Chemicals Co., Ltd.) | 0.2 parts |
| Water | Balance. |

The pigment dispersion 2 was prepared in the following manner. After 10 g of carbon black having a surface area of 230 m$^2$/g and a DBP oil absorption of 70 ml/100 g and 3.41 g of p-aminobenzoic acid were thoroughly mixed with 72 g of water, 1.62 g of nitric acid were added dropwise to the mixture, followed by stirring at 70° C. After several minutes, a solution of 1.07 g of sodium nitrite in 5 g of water was added to the mixture, and the resultant mixture was stirred for an additional 1 hour. The resultant slurry was filtered through Toyo Filter Paper No. 2 (product of Advantes Co.), and the resultant pigment particles were fully washed with water and dried in an oven controlled to 90° C. Water was added to the resultant dry pigment to prepare an aqueous dispersion of the pigment having a pigment concentration of 10% by weight. The above-described process was followed to obtain the pigment dispersion 2 in which self-dispersing carbon black anionically charged by bonding a hydrophilic group through a phenyl group to the surface thereof as represented by the formula

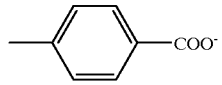

was dispersed.

The pigment dispersion 4 was prepared in the same manner as in EXAMPLE 1. The Ka value of the thus-obtained Bk ink was 0.35 ml·m$^{-2}$·msec$^{-½}$.

EXAMPLE 3

As a further example of the Bk ink, an ink comprising the following components may also be used.

| | |
|---|---|
| Pigment dispersion 3 | 45 parts |
| Pigment dispersion 4 | 2.5 parts |
| C.I. Direct Blue 199 | 0.25 parts |
| Glycerol | 6 parts |
| Diethylene glycol | 5 parts |
| Acetylenol EH | 0.1 parts |
| Water | Balance. |

The pigment dispersion 3 was prepared in the following manner. To a solution of 5 g of concentrated hydrochloric acid in 5.3 g of water were added 1.58 g of anthranilic acid at 5° C. The mixture was stirred in an ice bath, thereby always holding it at 10° C. or lower. In this state, a solution with 1.78 g of sodium nitrite dissolved in 8.7 g of water at 5° C. was added. After stirring for 15 minutes, 20 g of carbon black having a surface area of 320 m$^2$/g and a DBP oil absorption of 120 ml/100 g were added to the resultant mixture with stirring. The resultant mixture was then stirred for an additional 15 minutes. The resultant slurry was filtered through Toyo Filter Paper No. 2 (product of Advantes Co.), and the resultant pigment particles were fully washed with water and dried in an oven controlled to 110C. Water was then added to the thus-obtained dry pigment to prepare an aqueous dispersion of the pigment having a pigment concentration of 10% by weight. The above-described process was followed to obtain the pigment dispersion 3 in which self-dispersing carbon black anionically charged by bonding a hydrophilic group through a phenyl group to the surface thereof as represented by the formula

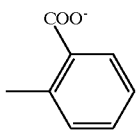

was dispersed. The pigment dispersion 4 was prepared in the same manner as in EXAMPLE 1.

The Ka value of the thus-obtained Bk ink was 0.33 ml·m$^{-2}$·msec$^{-½}$.

Comparative Example 1

As a comparative example with EXAMPLES 1 to 3 described above, the pigment dispersion 4 alone prepared in the same manner as in EXAMPLE 1 was used to prepare an ink comprising the following components:

| | |
|---|---|
| Pigment dispersion 4 | 50 parts |
| Ethylene glycol | 8 parts |
| Glycerol | 5 parts |
| Isopropyl alcohol | 4 parts |
| Water | Balance. |

[Evaluation]

Each of the inks obtained in EXAMPLES 1 to 3 and COMPARATIVE EXAMPLE 1 was used to conduct printing by means of an ink-jet printer equipped with a printing head having resolution of 360 dpi at ejection frequency of 7.2 kHz and at intervals of 720 dpi towards a main scanning direction. The quantity per drop of the ink ejected from the recording head was controlled to about 25 pl and one droplet of the ink was applied to 1 pixel for an image having a resolution of 360 dpi×720 dpi, thereby conducting printing. A solid print, a character pattern and the like were printed to evaluate the images as to OD, peripheral shape of dots, evenness of solid printed area, resistance to strike-through, smoothness and roundness. As the printing medium, was used PB paper (product of Canon Inc.).

In the evaluation, OD is a measured value as to a solid printed pattern of 5 mm square.

The peripheral shape of dots was determined by visually observing the sharpness of an edge of a line image through a magnifier and ranked in accordance with the following standard:

AA: The edge of a line was finely connected in a straight line;

A: The linearity of edge of a line was somewhat lost, but no problem arose in practical use;

C: The linearity of edge of a line was lost.

The evenness of solid printed area determined by visually observing the evenness of density in a solid printed pattern of 5 mm square and ranked in accordance with the following standard:

AA: No blank area was observed;

A: Blank areas were observed, but no problem arose in practical use;

C: Blank areas were conspicuous and affected the quality of the image.

The resistance to strike-through was determined by visually observing a solid printed pattern from the back side to check whether the pattern was seen through or not, and measuring the optical density of its corresponding portion on the back side by a Macbeth densitometer, and ranked in accordance with the following standard:

AA: The pattern was scarcely seen through, and the optical density was lower than 0.2 as measured by the Macbeth densitometer;

A: The pattern was slightly seen through, but it scarcely weighed, and the optical density was not lower than 0.2, but lower than 0.25 as measured by the Macbeth densitometer;

The roundness was determined by observing the shape of an ink dot formed on the printing medium by one drop of the ink through a magnifier, and ranked in accordance with the following standard:

AA: Most of dots were close to a circle statistically judging;

A: The roundness of some dots was lost statistically judging, but did not interfere with the formation of images;

B: The roundness of a considerable number of dots was lost statistically judging, and dots of irregular shapes were formed.

The above results are shown in Table 2.

TABLE 2

|  | Example 1 | Example 2 | Example 3 | Comparative Example 1 |
| --- | --- | --- | --- | --- |
| OD | 1.45 | 1.47 | 1.45 | 1.1 |
| Dot diameter ($\mu$m) | 67 | 70 | 72 | 48 |
| Peripheral shape of dot | AA | AA | AA | C |
| Evenness of solid printed area | AA | AA | AA | C |
| Strike-through | AA | AA | A | AA |
| Roundness | AA | AA | AA | B |

An ink comprising the first pigment along was prepared, and printing is conducted in the same manner as described above, thereby making evaluation. As a result, results corresponding to A in light of the above evaluation standards were yielded as to all items, and so the ink was an ink causing no problem in practical use. However, the inks according to this embodiment exhibited performance far beyond it. It is thus apparent that the present invention has utility and significance.

The ink prepared in EXAMPLE 3 and the apparatus used in EXAMPLE 1 were then used to print a solid print of a prescribed size on a transparent film (CF102, trade name, product of Canon Inc.) on which a coating layer had been formed, thereby evaluating the ink as to whether "cracking" occurred or not. As a result, no "cracking" was observed. On the other hand, the phenomenon of "cracking" was observed in the case where the ink according to COMPARATIVE EXAMPLE 1 was used.

The same inks as used above were used to conduct printing on a transparent film (CF101, trade name, product of Canon Inc.) on which a coating layer had been formed, thereby evaluating the inks as to whether "cracking" occurred or not. As a result, when the ink according to COMPARATIVE EXAMPLE 1 was used, the phenomenon of "cracking" was observed more remarkably than when printing was conducted on CF102. However, no "cracking" was observed when the ink according to EXAMPLE 3 was used.

[Other Examples]

Figure 4:
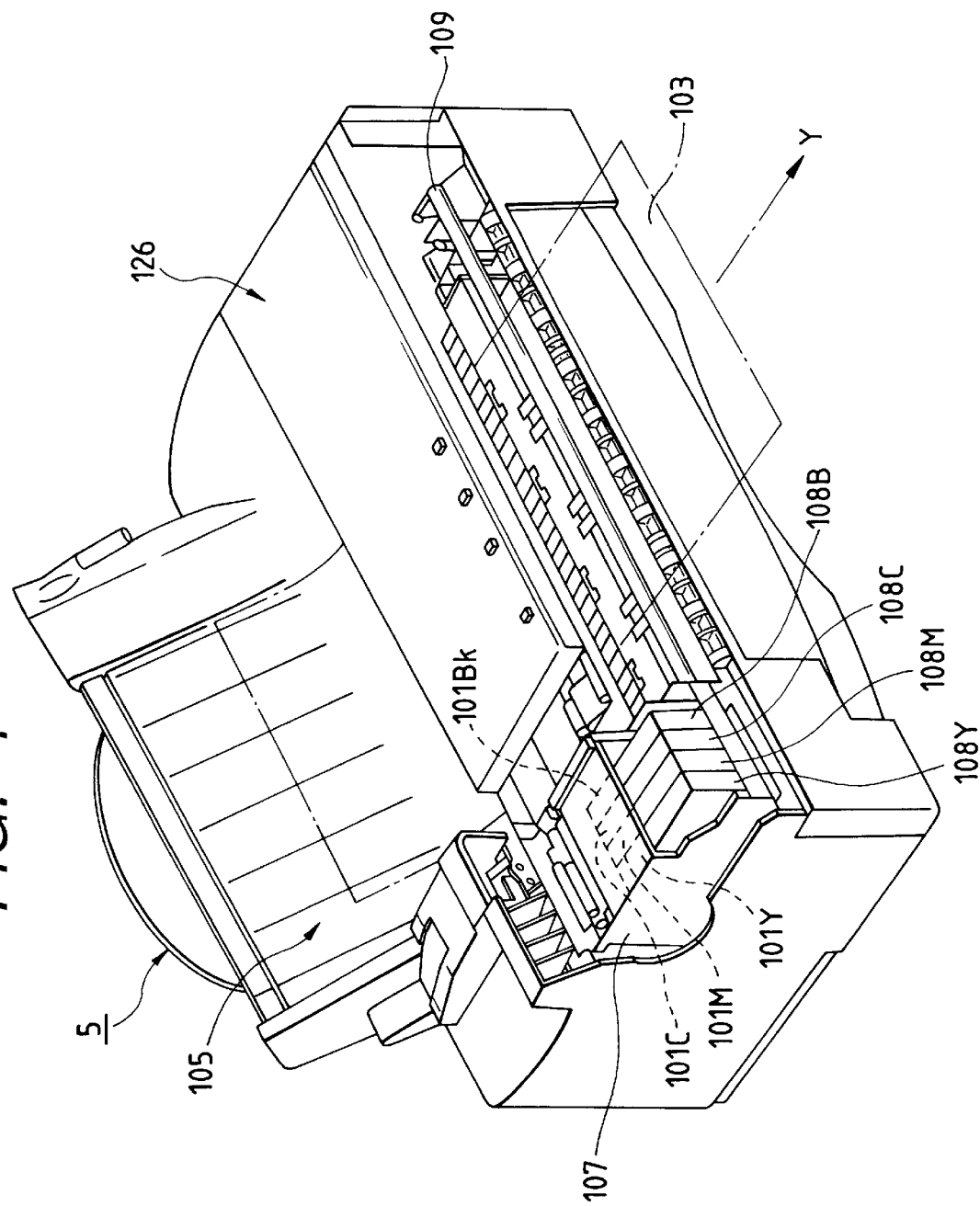
FIG. 4 is a perspective view illustrating an ink-jet printer according to another embodiment of the present invention.

FIG. 4 illustrates another apparatus in which the inks according to the above-described examples can be used, and is a schematic perspective view illustrating the construction of a serial type printing apparatus 5. In FIG. 4, the same elements as those shown in FIG. 3 are given like reference characters and their description is omitted.

Recording paper 103 which is a printing medium is inserted from a paper feed part 105 and discharged through a printing part 126. In the printing part 126, a carriage 107 mounts printing heads 101Bk, 101C, 101M and 101Y and is so constructed that can be reciprocated along a guide rail 109 by driving force of a motor (not illustrated). The printing head 101Bk ejects a black ink according to this embodiment. The printing heads 10C, 101M and 101Y eject a cyan ink, a magenta ink and a yellow ink, respectively. These printing heads are driven so as to eject the inks to the recording paper 103 in that order.

To the respective heads, the inks are fed from ink tanks 108Bk, 108C, 108M and 108Y containing their corresponding inks to be ejected therein. Upon ejection of the inks, a drive signal is fed to an electrothermal converter (heater) provided on each ejection opening of each head, whereby thermal energy is applied to its corresponding ink to generate bubbles, and the ink is ejected by using the pressure produced upon the bubbling. In each head, are provided 64 ejection openings at a density of 360 dpi. These openings are arranged in almost the same direction as the conveying direction Y of the recording paper 103, i.e., a direction almost perpendicular to the scanning direction of each head. The amount of the ink ejected from each ejection opening is 23 pl.

In the above-described construction, a distance among the heads is ½ inch. Therefore, a distance Di between the head 101Bk and the head 101C amounts to 1 inch, and printing density in the scanning direction and ejection frequency of each head are 720 dpi and 7.2 kHz, respectively.

Figure 5:
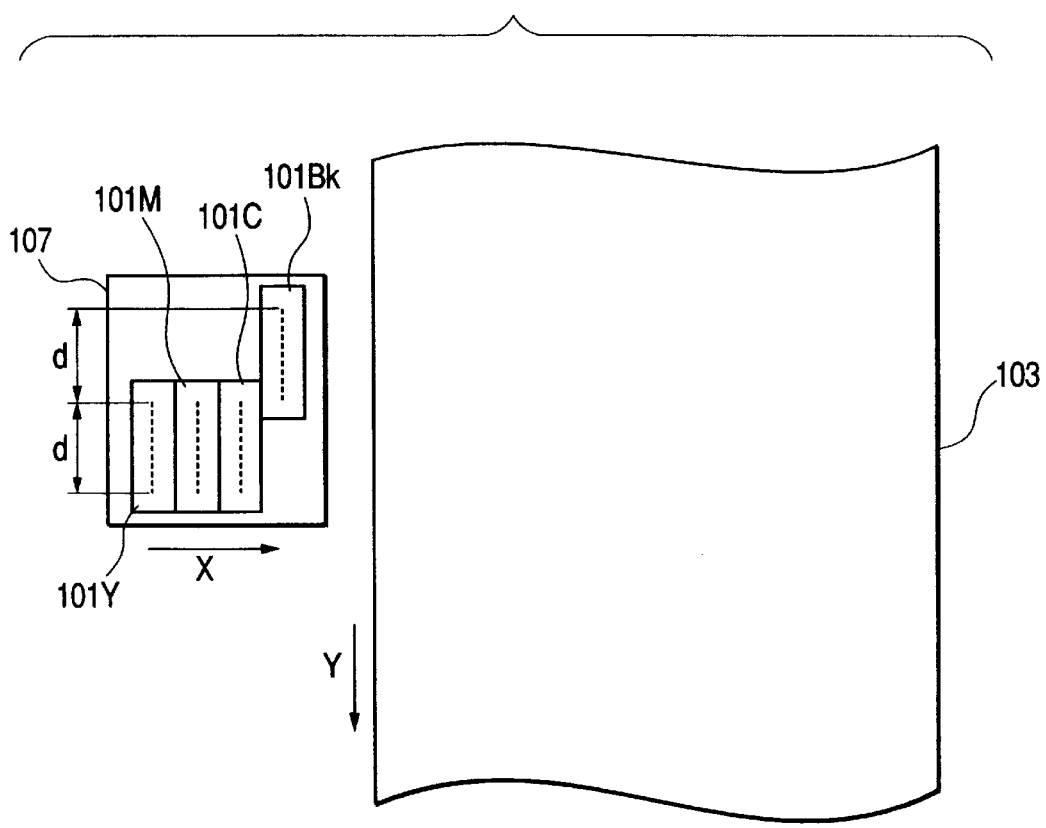
FIG. 5 illustrates a printing operation in the printer shown in FIG. 4.

FIG. 5 is a view for explaining the printing process by the serial type printing apparatus illustrated in FIG. 4 and schematically illustrates a state viewed from above a printing part 126. In FIG. 5, a carriage 107 reciprocates in a direction X almost perpendicular to the conveying direction Y of the recording paper 103 over the recording paper 103 to be conveyed. Ejection openings (indicating dots in FIG. 5) of a black ink ejection part 101Bk and color ink ejection parts (101C, 101M and 101Y) mounted on the carriage 107 open in a direction ejecting the respective inks to the recording paper 103.

In each ejection part, the ejection openings are so arranged that printing of a width d along the conveying direction Y of the recording paper 103 can be performed by one scanning. In order to provide a time difference between ink ejection by the black ink ejection part 101Bk and ejection of the color inks, the black ink ejection part 101Bk and the color ink ejection parts are arranged at positions deviated from each other along the conveying direction by a distance of the printing width d. This time difference of ejection corresponds to the time during which the penetration of the black ink within a prescribed range in the thickness direction of the recording paper is almost completed. By constructing so, the ejection of the black ink from the black ink ejection part 101Bk to the prescribed position of the recording paper 103 and the ejection of the color inks are deviated by one scan (scan cycle was defined as 1.5 seconds) of the carriage 107 and conducted in the above-described prescribed time difference, whereby the feathering or bleeding at the border between a black image and other color images can be solved.

Figure 6A:
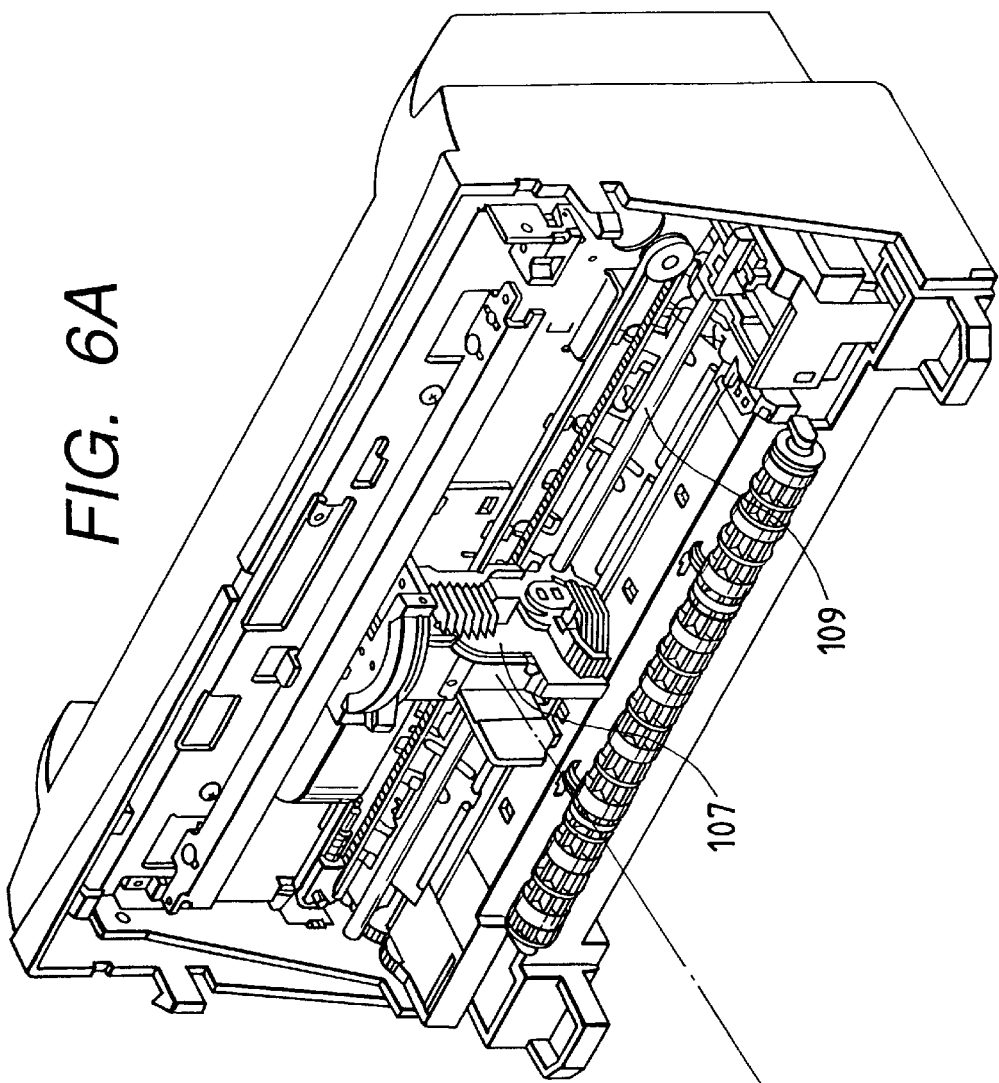
FIG. 6A is a perspective view illustrating an ink-jet printer according to a further embodiment of the present invention.

FIG. 6A is a perspective view illustrating an ink-jet printer according to a further embodiment of the present invention.

Figure 6B:
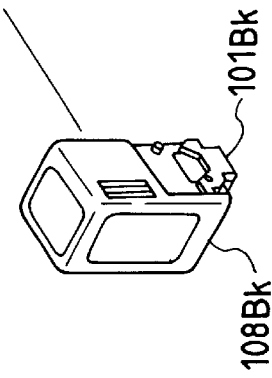
FIG. 6B is a perspective view illustrating an ink tank installed in the printer shown in FIG. 6A.

FIG. 6B is a perspective view illustrating a black ink tank, which will be mounted to the ink-jet printer of FIG. 6A.

The same elements as those shown in FIGS. 3 and 4 are given like reference characters and their description is omitted. As illustrated in FIGS. 6A and 6B, an ink according to an embodiment of the present invention may also be used as a black ink in a monocolor printer.

As apparent from the above description, in the inks according to the present invention, comprising a self-dispersing pigment (first pigment), a pigment (second pigment) which can be dispersed in an aqueous medium for the first time by the action of a dispersing agent, and the dispersing agent, the second pigment is stably dispersed in the inks even when the content of the dispersing agent is low, probably because the first pigment itself functions as a dispersing agent for the second pigment. Therefore, the inks are provided as inks excellent in storability. On the other hand, when such an ink is used in, for example, printing, the aggregation of the pigment caused on a printing medium by the interaction between the second pigment and the dispersing agent is relieved by the first pigment, and so the aggregates of the pigment can be uniformly dispersed in the form of fine particles in ink dots, thereby providing ink dots which have a dot diameter moderately spread and even optical density of image distribution within dots, scarcely cause feathering and the like and have excellent peripheral or external shape.

In the inks according to another embodiment of the present invention, comprising the first pigment, the second pigment, the dispersing agent and a dye, aggregates of the pigment formed on a printing medium exist in the form of fine particles because the cohesion of the pigment is relieved by the dye. On the other hand, the periphery of the pigment in the form of particles is surrounded with the dye, and so as the whole printed image, unevenness by aggregation is prevented. The effect thereof is most remarkably observed in that occurrence of "cracking" in ink dots can be extremely effectively suppressed or prevented even when printing is conducted by an ink-jet system on a printing medium poor in ink absorbency using such an ink.

What is claimed is:

1. An ink comprising a first pigment, a second pigment and a dispersant, both of the pigments being dispersed in an aqueous medium, wherein the first pigment is a self-dispersing pigment having an anionic group or a cationic group, the group being bonded directly or through an atomic group to a surface of the first pigment, the second pigment is a pigment dispersible in an aqueous medium with the dispersant, and the dispersant is an ionic polymeric dispersant having a same polarity as that of the group bonded to the surface of the first pigment or a nonionic polymeric dispersant.

2. The ink according to claim 1, wherein the Ka value of the ink in the Bristow method is lower than 1 $ml·m^{-2}·msec^{-1/2}$.

3. The ink according to claim 1, wherein the anionic group bonded to the surface of the pigment is at least one anionic group selected from the group consisting of —COOM, —$SO_3M$, —$PO_3HM$ and —$PO_3M_2$, wherein M is hydrogen, alkali metal, ammonium or organic ammonium.

4. The ink according to claim 1, wherein said atomic group is a substituted or unsubstituted alkylene group having 1 to 12 carbon atoms, a substituted or unsubstituted phenylene group, or a substituted or unsubstituted naphthylene group.

5. The ink according to claim 1, wherein at least 80% of the first pigment has a particle diameter of 0.05 to 0.3 $\mu$m.

6. The ink according to claim 5, wherein at least 80% of the first pigment has a particle diameter of 0.1 to 0.25 $\mu$m.

7. The ink according to claim 1 or 3, wherein the second pigment is dispersed by adsorbing the dispersant on the surface thereof.

8. The ink according to claim 1, wherein the dispersant is at least one of a sulfonic acid polymeric dispersant and a carboxylic acid polymeric dispersant.

9. The ink according to claim 1, further comprising at least a third pigment different in structure from the second pigment.

10. The ink according to claim 1, wherein a ratio of the first pigment to the second pigment is within a range of from 5/95 to 97/3.

11. The ink according to claim 10, wherein a ratio of the first pigment to the second pigment is within a range of from 10/90 to 95/5.

12. The ink according to claim 11, wherein a ratio of the first pigment to the second pigment is within a range of from 9/1 to 4/6.

13. The ink according to claim 1, wherein the first pigment is contained in a larger amount than the second pigment.

14. The ink according to claim 1, wherein at least one of the first pigment and the second pigment is carbon black.

15. The ink according to claim 1, which further comprises a dye having the same polarity as that of the group bonded to the surface of the first pigment.

16. The ink according to claim 15, wherein the dye is an anionic dye or a cationic dye.

17. The ink according to claim 16, wherein the anionic dye is at least one selected from the group consisting of acid dyes, direct dyes and reactive dyes.

18. The ink according to claim 16, wherein the anionic dye has a disazo skeleton or a trisazo skeleton.

19. An ink used in an image printing process comprising the steps of ejecting an ink from an orifice by means of an ink-jet system; applying the ink to a printing medium; and forming an element of an image, the ink comprising a first pigment, a second pigment and a dispersant, both of the pigments being dispersed in an aqueous medium, wherein the first pigment is a self-dispersing pigment having an anionic group or a cationic group, the group being bonded directly or through an atomic group to a surface of the first pigment, the second pigment is a pigment dispersible in an aqueous medium with the dispersant, and the dispersant is an ionic polymeric dispersant having a same polarity as that of the group bonded to the surface of the first pigment or a nonionic polymeric dispersant.

20. The ink according to claim 19, wherein the Ka value of the ink in the Bristow method is lower than 1 ml·m$^{-2}$·msec$^{-\frac{1}{2}}$.

21. The ink according to claim 19, wherein the anionic group bonded to the surface of the pigment is at least one anionic group selected from the group consisting of —COOM, —SO$_3$M, —PO$_3$HM and —PO$_3$M$_2$, wherein M is hydrogen, alkali metal, ammonium or organic ammonium.

22. The ink according to claim 19, wherein said atomic group is a substituted or unsubstituted alkylene group having 1 to 12 carbon atoms, a substituted or unsubstituted phenylene group, or a substituted or unsubstituted naphthylene group.

23. The ink according to claim 19, wherein at least 80% of the first pigment has a particle diameter of 0.05 to 0.3 μm.

24. The ink according to claim 23, wherein at least 80% of the first pigment has a particle diameter of 0.1 to 0.25 μm.

25. The ink according to claim 19 or 21, wherein the second pigment is dispersed by adsorbing the dispersant on the surface thereof.

26. The ink according to claim 19, wherein the dispersant is at least one of a sulfonic acid polymeric dispersant and a carboxylic acid polymeric dispersant.

27. The ink according to claim 19, further comprising at least a third pigment different in structure from the second pigment.

28. The ink according to claim 19, wherein a ratio of the first pigment to the second pigment is within a range of from 5/95 to 97/3.

29. The ink according to claim 28, wherein a ratio of the first pigment to the second pigment is within a range of from 10/90 to 95/5.

30. The ink according to claim 29, wherein a ratio of the first pigment to the second pigment is within a range of from 9/1 to 4/6.

31. The ink according to claim 19, wherein the first pigment is contained in a larger amount than the second pigment.

32. The ink according to claim 19, wherein at least one of the first pigment and the second pigment is carbon black.

33. An ink-jet printing process comprising the steps of ejecting an ink toward a printing medium by means of an ink-jet system; and forming an image on the printing medium, wherein the ink comprises a first pigment, a second pigment and a dispersant, both of the pigments being dispersed in an aqueous medium, wherein the first pigment is a self-dispersing pigment having an anionic group or a cationic group, the group being bonded directly or through an atomic group to a surface of the first pigment, the second pigment is a pigment dispersible in an aqueous medium with the dispersant, and the dispersant is an ionic polymeric dispersant having a same polarity as that of the group bonded to the surface of the first pigment or a nonionic polymeric dispersant.

34. The ink-jet printing process according to claim 33, wherein the Ka value of the ink in the Bristow method is lower than 1 ml·m$^{-2}$·msec$^{-\frac{1}{2}}$.

35. The ink-jet printing process according to claim 33 or 34, which comprises the step of applying thermal energy to the ink to eject the ink from an orifice to the printing medium.

36. The ink-jet printing process according to claim 33, wherein the anionic group bonded to the surface of the pigment is at least one anionic group selected from the group consisting of —COOM, —SO$_3$M, —PO$_3$HM and —PO$_3$M$_2$, wherein M is hydrogen, alkali metal, ammonium or organic ammonium.

37. The ink-jet printing process according to claim 33, wherein said atomic group is a substituted or unsubstituted alkylene group having 1 to 12 carbon atoms, a substituted or unsubstituted phenylene group, or a substituted or unsubstituted naphthylene group.

38. The ink-jet printing process according to claim 33, wherein at least 80% of the first pigment has a particle diameter of 0.05 to 0.3 μm.

39. The ink-jet printing process according to claim 33, wherein at least 80% of the first pigment has a particle diameter of 0.1 to 0.25 μm.

40. The ink-jet printing process according to claim 33, wherein the second pigment is dispersed by adsorbing the dispersant on the surface thereof.

41. The ink-jet printing process according to claim 33, wherein the dispersant is at least one of a sulfonic acid polymeric dispersant and a carboxylic acid polymeric dispersant.

42. The ink-jet printing process according to claim 33, further comprising at least a third pigment different in structure from the second pigment.

43. The ink-jet printing process according to claim 33, wherein a ratio of the first pigment to the second pigment is within a range of from 5/95 to 97/3.

44. The ink-jet printing process according to claim 43, wherein a ratio of the first pigment to the second pigment is within a range of from 10/90 to 95/5.

45. The ink-jet printing process according to claim 44, wherein a ratio of the first pigment to the second pigment is within a range of from 9/1 to 4/6.

46. The ink-jet printing process according to claim 33, wherein the first pigment is contained in a larger amount than the second pigment.

47. The ink-jet printing process according to claim 33, wherein at least one of the first pigment and the second pigment is carbon black.

48. The ink-jet printing process according to claim 33, wherein the ink further comprises a dye having the same polarity as that of the group bonded to the surface of the first pigment.

49. The ink-jet printing process according to claim 48, wherein the dye is an anionic dye or a cationic dye.

50. The ink-jet printing process according to claim 49, wherein the anionic dye is at least one selected from the group consisting of acid dyes, direct dyes and reactive dyes.

51. The ink-jet printing process according to claim 50, wherein the anionic dye has a disazo skeleton or a trisazo skeleton.

52. The ink-jet printing process according to claim 33, which comprises the step of applying thermal energy to the ink to eject the ink making use of bubbling by film boiling.

53. An ink-jet printing process comprising the steps of ejecting an ink toward an outer surface of a coating layer of a printing medium provided with the coating layer by means of an ink-jet system; and forming an image on the outer surface of the coating layer, wherein the ink comprises a first pigment, a second pigment and a dispersant, both of the pigments being dispersed in an aqueous medium, wherein the first pigment is a self-dispersing pigment having an anionic group or a cationic group, the group being bonded directly or through an atomic group to a surface of the first pigment, the second pigment is a pigment dispersible in an aqueous medium with the dispersant, and the dispersant is an ionic polymeric dispersant having a same polarity as that of the group bonded to the surface of the first pigment or a nonionic polymeric dispersant.

54. The ink-jet printing process according to claim 53, wherein the Ka value of the ink in the Bristow method is lower than 1 ml·m$^{-2}$·msec$^{-\frac{1}{2}}$.

55. The ink-jet printing process according to claim 53, which comprises the step of applying thermal energy to the ink to eject the ink making use of bubbling by film boiling.

56. The ink-jet printing process according to claim 53, wherein the anionic group bonded to the surface of the pigment is at least one anionic group selected from the group consisting of —COOM, —SO$_3$M, —PO$_3$HM and —PO$_3$M$_2$, wherein M is hydrogen, alkali metal, ammonium or organic ammonium.

57. The ink-jet printing process according to claim 53, wherein said atomic group is a substituted or unsubstituted alkylene group having 1 to 12 carbon atoms, a substituted or unsubstituted phenylene group, or a substituted or unsubstituted naphthylene group.

58. The ink-jet printing process according to claim 53, wherein at least 80% of the first pigment has a particle diameter of 0.05 to 0.3 μm.

59. The ink-jet printing process according to claim 58, wherein at least 80% of the first pigment has a particle diameter of 0.1 to 0.25 μ.

60. The ink-jet printing process according to claim 53, wherein the second pigment is dispersed by adsorbing the dispersant on the surface thereof.

61. The ink-jet printing process according to claim 53 or 60, wherein the dispersant is at least one of a sulfonic acid polymeric dispersant and a carboxylic acid polymeric dispersant.

62. The ink-jet printing process according to claim 53, further comprising at least a third pigment different in structure from the second pigment.

63. The ink-jet printing process according to claim 53, wherein a ratio of the first pigment to the second pigment is within a range of from 5/95 to 97/3.

64. The ink-jet printing process according to claim 53, wherein a ratio of the first pigment to the second pigment is within a range of from 10/90 to 95/5.

65. The ink-jet printing process according to claim 64, wherein a ratio of the first pigment to the second pigment is within a range of from 9/1 to 4/6.

66. The ink-jet printing process according to claim 53, wherein the first pigment is contained in a larger amount than the second pigment.

67. The ink-jet printing process according to claim 53, wherein at least one of the first pigment and the second pigment is carbon black.

68. The ink-jet printing process according to claim 53, wherein the resin contained in the coating layer is a water-soluble resin or a water-dispersible resin.

69. The ink-jet printing process according to claim 68, wherein the water-soluble resin is at least one resin selected from the group consisting of polyvinyl alcohol, anionically modified polyvinyl alcohol, cationically modified polyvinyl alcohol, acetal-modified polyvinyl alcohol, hydrophilic polyurethane, polyvinyl pyrrolidone, vinyl pyrrolidone-vinyl acetate copolymers, vinylpyrrolidone-dimethylaminoethyl methacrylate copolymers, quaternized vinyl pyrrolidone-dimethylaminoethyl methacrylate copolymers, vinylpyrrolidone-methacrylamidopropyltrimethylammonium chloride copolymers, carboxymethyl cellulose, hydroxyethyl cellulose, hydroxypropyl cellulose, cationic hydroxyethyl cellulose, polyester, polyacrylic acid, polyacrylates, melamine resins, graft copolymers comprising polyester and polyurethane, albumin, gelatin, casein, starch, cationic starch, gum arabic and sodium alginate.

70. The ink-jet printing process according to claim 68, wherein the water-dispersible resin is at least one resin selected from the group consisting of polyvinyl acetate, ethylene-vinyl acetate copolymers, polystyrene, styrene-acrylate copolymers, styrene-methacrylate copolymers, acrylate copolymers, methacrylate copolymers, vinyl acetate-acrylic acid copolymers, vinyl acetate-acrylate copolymers, vinyl acetate-methacrylic acid copolymers, vinyl acetate-methacrylate copolymers, polyacrylamide, polymethacrylamide, acrylamide copolymers, methacrylamide copolymers, styrene-isoprene copolymers, styrene-butadiene copolymers, styrene-propylene copolymers, polyvinyl ether and silicone-acrylic copolymers.

71. An image forming process comprising the steps of:
 (i) providing a first ink containing an aqueous medium and a first pigment which is a self-dispersing pigment dispersible in the aqueous medium by itself, the first pigment having an anionic group or a cationic group, and the group being bonded directly or through an atomic group to a surface of the first pigment;
 (ii) providing a second ink containing an aqueous medium and a second pigment dispersible in the aqueous medium with a dispersant, the dispersant being at least one of a nonionic polymeric dispersant and an ionic polymeric dispersant having a same polarity as that of the group bonded to the pigment in the first ink;
 (iii) applying the first ink and the second ink on a printing medium respectively so that the first ink and the second ink come into contact with each other in liquid state on a surface of the printing medium; and
 (iv) forming an image on the recording medium.

72. The image forming process according to claim 71, wherein the step (iii) comprises the sub-steps of:
 (i) mixing the first ink with the second ink before the inks reach to the surface of the printing medium; and
 (ii) attaching a mixed ink resulting from the sub-step (i) to the surface of the printing medium.

73. The image forming process according to claim 72, wherein the Ka value in the Bristow method of the ink mixture composed of the first and second inks is lower than 1 ml·m$^{-2}$·msec$^{-\frac{1}{2}}$.

74. The image forming process according to claim 71, wherein the step (iii) comprises the sub-steps of:
 (i) attaching the first ink to a first position on the printing medium;
 (ii) attaching the second ink to a second position at least a part of which overlaps to the first position, wherein the sub-steps (i) and (ii) are conducted so that the first and the second inks come in to contact with each other in liquid state on the surface of the printing medium.

75. An image forming process comprising the steps of:
 (i) providing a first ink containing an aqueous medium and a first pigment which is a self-dispersing pigment dispersible in the aqueous medium by itself, the pigment having an anionic group or a cationic group, and the group being bonded directly or through an atomic group to a surface of the first pigment;
 (ii) providing a second ink containing an aqueous medium and a second pigment dispersible in the aqueous medium with a dispersant, the dispersant being at least one of a nonionic polymeric dispersant and an ionic polymeric dispersant having a same polarity as that of the group bonded to the pigment in the first ink;

(iii) providing a third ink containing a dye having a same polarity as that of the group bonded to the pigment in the first ink;

(iv) applying the first, second and third inks to a printing medium so that the inks come into contact with each other in liquid state on a surface of the printing medium.

76. The image forming process according to claim 75, wherein the step (iv) comprises the sub-steps of:

(i) mixing the first, second and third inks before the respective inks reach to the printing medium; and (ii) attaching a mixed ink resulting from the sub-step (i).

77. The image forming process according to claim 76, wherein the Ka value in the Bristow method of the ink mixture composed of the first, second and third inks is lower than 1 ml·m$^{-2}$·msec$^{-1/2}$.

78. The image forming process according to claim 75, wherein the step (iv) comprises the sub-step of:

(i) attaching the first ink to a first position on the printing medium;

(ii) attaching the second ink to a second position on the printing medium, at least a part of which overlaps the first position; and (iii) attaching the third ink to a third position on the printing medium, at least a part of which overlaps the first and the second positions, wherein the sub-steps (i), (ii) and (iii) are conducted so that the first, second and third inks come into contact with each other in liquid state on the surface of the printing medium.

79. An ink container containing an ink therein, wherein the ink comprises a first pigment, a second pigment and a dispersant, both of the pigments being dispersed in an aqueous medium, wherein the first pigment is a self-dispersing pigment having an anionic group or a cationic group, the group being bonded directly or through an atomic group to a surface of the first pigment, the second pigment is a pigment dispersible in an aqueous medium with the dispersant, and the dispersant is an ionic polymeric dispersant having a same polarity as that of the group bonded to the surface of the first pigment or a nonionic polymeric dispersant.

80. An ink set comprising, in combination, a black ink which comprises a first pigment, a second pigment and a dispersant, both of the pigments being dispersed in an aqueous medium, wherein the first pigment is a self-dispersing carbon black having an anionic group or a cationic group, the group being bonded directly or through an atomic group to a surface of the first pigment, the second pigment is a pigment dispersible in an aqueous medium with the dispersant, and the dispersant is an ionic polymeric dispersant having a same polarity as that of the group bonded to the surface of the first pigment or a nonionic polymeric dispersant, and at least one ink selected from the group consisting of a yellow ink, a magenta ink and a cyan ink.

81. The ink set according to claim 80, wherein the black ink further comprises a dye having the same polarity as that of the group bonded to the surface of the first pigment.

82. The ink set according to claim 80, wherein the Ka value of the black ink in the Bristow method is lower than 1 ml·m$^{-2}$·msec$^{-1/2}$.

83. The ink set according to claim 80, wherein the Ka value of each of the yellow, magenta and cyan inks in the Bristow method is at least 1 ml·m$^{-2}$·msec$^{-1/2}$.

84. An ink-jet printing apparatus comprising ink container portions which separately contain a black ink comprising a first pigment, a second pigment and a dispersant, both of the pigments being dispersed in an aqueous medium, wherein the first pigment is a self-dispersing carbon black having an anionic group or a cationic group, the group being bonded directly or through an atomic group to a surface of the first pigment, the second pigment is a pigment dispersible in an aqueous medium with the dispersant, and the dispersant is an ionic polymeric dispersant having a same polarity as that of the group bonded to the surface of the first pigment or a nonionic polymeric dispersant, a yellow ink, a magenta ink and a cyan ink therein, and means for respectively ejecting the black, yellow, magenta and cyan inks by an ink-jet system.

85. The ink-jet printing apparatus according to claim 84, wherein the black ink further comprises a dye having the same polarity as that of the group bonded to the surface of the first pigment.

86. The ink-jet printing apparatus according to claim 84 or 85, wherein the Ka value of the black ink in the Bristow method is lower than 1 ml·m$^{-2}$·msec$^{-1/2}$.

87. The ink-jet printing apparatus according to claim 84, wherein the Ka value of each of the yellow, magenta and cyan inks in the Bristow method is at least 1 ml·m$^{-2}$·msec$^{-1/2}$.

88. The image forming process according to claim 71, wherein the image to be formed in step (iv) is a mono-color image.

\* \* \* \* \*

UNITED STATES PATENT AND TRADEMARK OFFICE
CERTIFICATE OF CORRECTION

PATENT NO.   : 6,387,168 B1
DATED        : May 14, 2002
INVENTOR(S)  : Noribumi Koitabashi et al.

It is certified that error appears in the above-identified patent and that said Letters Patent is hereby corrected as shown below:

Column 4,
Line 57, "an" (first occurrence) should read -- as --; and "an" (second occurrence) should be deleted.

Column 7,
Line 19, "the," should read -- the --.

Column 12,
Line 50, "• msec⁻ ₁/₂ )" should read -- •$msec^{-1/2}$) --.

Column 13,
Line 67, "Into" should read -- into --.

Column 14,
Line 1, "pre pared" should read -- prepared --.

Column 15,
Line 61, "1004" should read -- (1004) --.
Line 64, "(100)" should read -- (1006) --.

Column 16,
Line 60, "Surfactants" should read -- surfactants --.

Column 22,
Line 31, "10C" should read -- 101C --.

UNITED STATES PATENT AND TRADEMARK OFFICE
CERTIFICATE OF CORRECTION

PATENT NO.   : 6,387,168 B1
DATED        : May 14, 2002
INVENTOR(S)  : Noribumi Koitabashi et al.

It is certified that error appears in the above-identified patent and that said Letters Patent is hereby corrected as shown below:

<u>Column 27,</u>
Line 27, "0.25 $\mu$." should read -- 0.25 $\mu$m. --.

<u>Column 28,</u>
Line 55, "in to" should read -- into --.

Signed and Sealed this

Thirty-first Day of December, 2002

JAMES E. ROGAN
*Director of the United States Patent and Trademark Office*